UNITED STATES PATENT OFFICE.

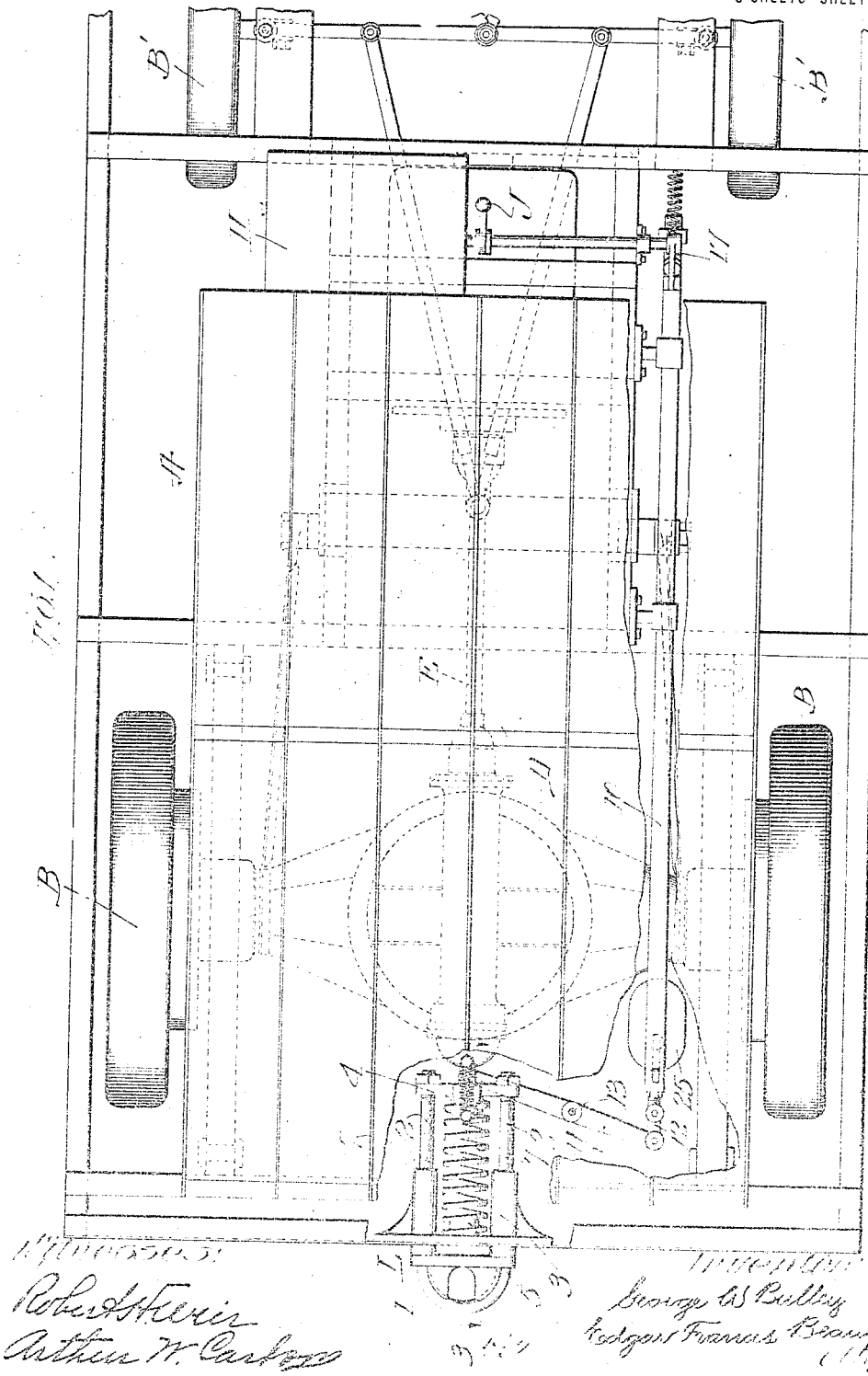

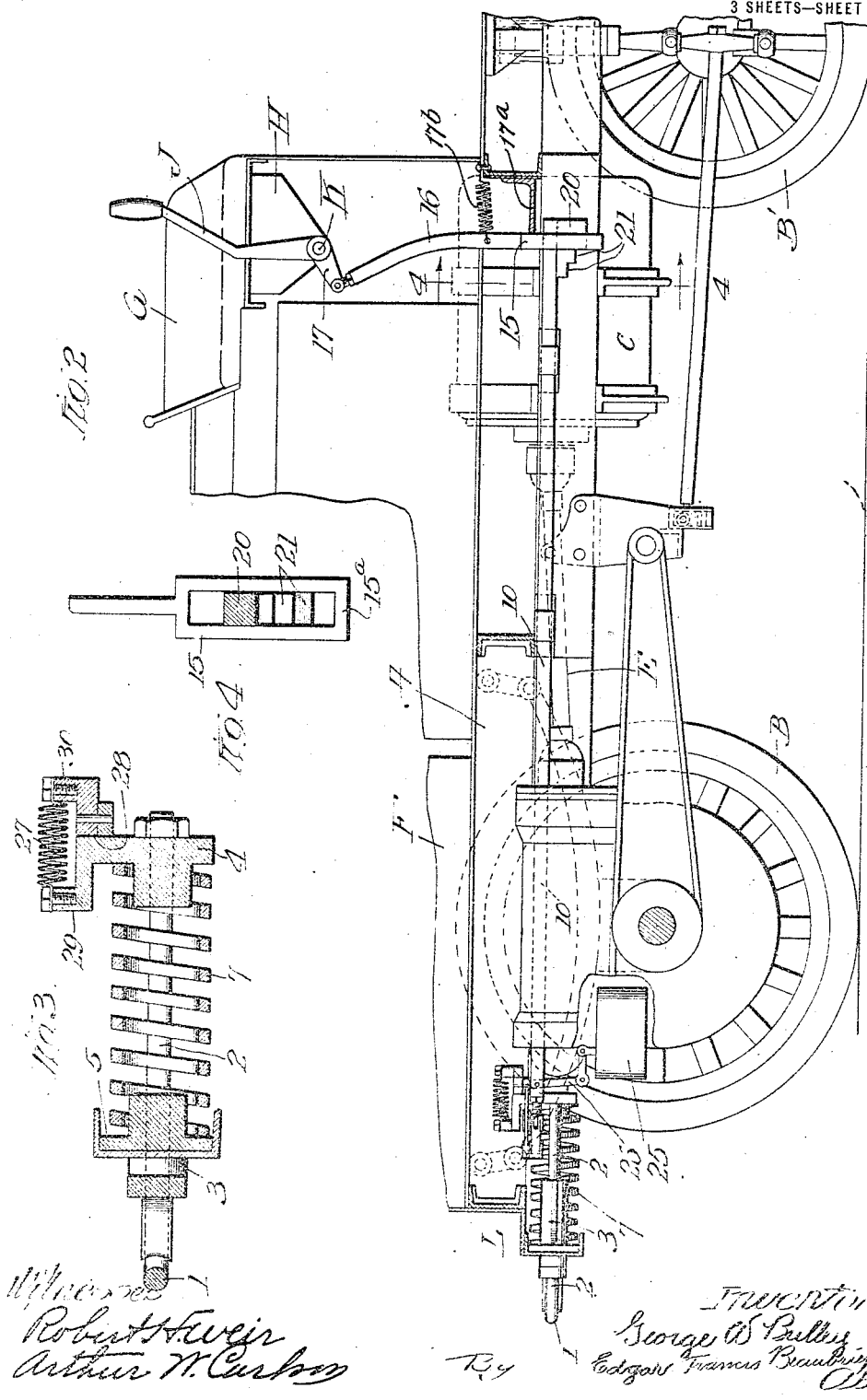

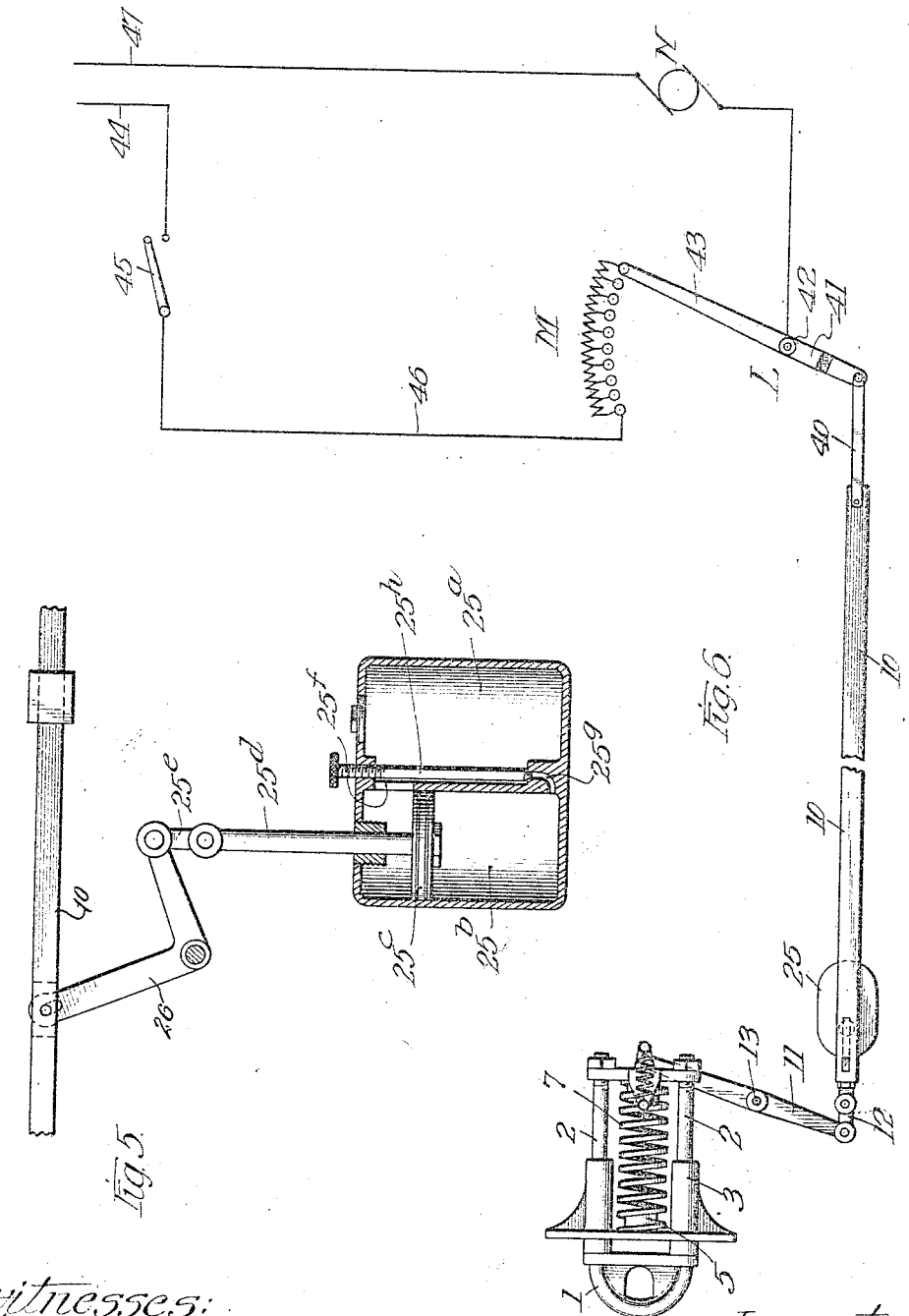

GEORGE W. BULLEY, OF CHICAGO, ILLINOIS, ASSIGNOR TO MERCURY MANUFACTURING COMPANY, OF CHICAGO, ILLINOIS, A CORPORATION OF ILLINOIS.

REGULATOR FOR DRAFT-VEHICLES.

1,267,742.  Specification of Letters Patent.  Patented May 28, 1918.

Application filed August 18, 1915. Serial No. 46,054.

*To all whom it may concern:*

Be it known that I, GEORGE W. BULLEY, a citizen of the United States of America, and resident of Chicago, Cook county, Illinois, have invented a certain new and useful Improvement in Regulators for Draft-Vehicles, of which the following is a specification.

My invention relates to improvements in vehicles, and more particularly to improvements in regulators for vehicles.

One of the objects of my invention is to provide an improved regulator or governor which is responsive to the load drawn or propelled by the vehicle and for controlling the action or effect of the vehicle on said load.

Other objects of my invention will appear hereinafter.

My invention consists in the features of novelty exemplified in the construction, combination and arrangement of parts hereinafter described, shown in the accompanying drawings and more particularly pointed out in the appended claims.

Referring to the drawings—

Figure 1 is a top plan view of the frame and running gear of a vehicle, the body being removed, embodying my invention;

Fig. 2 is a view in longitudinal section substantially through the center of Fig. 1;

Fig. 3 is an enlarged section, substantially on line 3—3 of Fig. 1, of my improved draw-bar used in this construction;

Fig. 4 is an enlarged detail section on the line 4—4 of Fig. 2, showing the connection of the mechanism with the vehicle controller;

Fig. 5 is a section of an adjustable dash-pot used in my improved construction; and Fig. 6 is a view illustrating my invention as applied to the direct actuation of a controller for governing the motor of the vehicle.

In the drawings, I have illustrated my invention as embodied in a type of draft vehicle or tractor which is designed to carry no load other than its own parts and driving mechanism, but instead is intended to draw or propel either single or entrained load-carrying vehicles. The tractor is connected to the load-carrying vehicle through the medium of a draw-bar and regulating mechanism which is responsive to said load for the purpose of regulating the effect or action of the draft vehicle. It will be obvious to one skilled in the art, after having obtained an understanding of my invention from the disclosures herein made, that my invention is capable of embodiment in other or modified structures without departing from the spirit and scope of the invention, and I wish it to be so understood.

In the present instance, the load is connected to the rear end of the tractor, and hence the vehicle or tractor acts in the capacity of a locomotive to pull or draw the load behind it. The vehicle shown is of the electric tractor type. The frame A is supported by two rear wheels B and two forward wheels B', the forward wheels being arranged in any suitable or approved manner for steering purposes. In this construction, driving power for the vehicle is applied to the rear wheels by means of an electric motor C and differential mechanism D on the rear axle, which may be of any suitable or approved type and need not be further described. The motor drives the differential mechanism through the medium of a shaft E, as clearly shown in the drawings. The motor in this case is mounted in any desirable manner on the frame A well toward the forward end thereof. Since this vehicle serves as a draft vehicle, and is, therefore, not intended to carry any load except its own mechanism, the frame may be provided with any suitable super-structure F which may inclose a battery or any other suitable or approved means for providing electric current for the motor C. At its forward portion, this super-structure may have a suitable seat G for the operator and a controller H for the motor. This controller is preferably positioned beneath the seat so that its operating handle or lever J may be positioned conveniently for the operator. The controller may be of any suitable or approved type, such as is generally used in vehicles of this character. These controllers, as is well known, operate to govern the current through the motor, but this is, of course, standard construction and needs no particular description. The controller arm is carried on the end of a shaft K which actuates the controller, and this controller arm occupies different "points" or positions to which it is moved to operate the controller and govern the current through the motor to regulate the speed of and tractive effort exerted by the wheels of the vehicle.

In the particular structure shown, as before mentioned, I have so arranged the mechanism that the vehicle operates to pull, rather than to push, a car or train of cars, and for this reason it is connected to the load through the medium of a rear end draw-bar connection L positioned at the rear end of the vehicle frame. This particular vehicle is especially adapted for handling freight and merchandise about warehouse floors, docks, wharves, freight platforms and the like, the load or merchandise being carried in suitable cars or trucks which are connected to the draw-bar L of the tractor. In places of this character, it is very undesirable, and in fact dangerous, to run the tractors or trains at too great a speed. In fact, it is desirable that the tractor be operated at a substantially uniform speed, whether it is running alone or with a load connected thereto. When the tractor is running free, or with a light load connected to it, the operator is often inclined to speed up the vehicle to a point beyond a safe and desirable running speed. It is the purpose of my invention, therefore, to provide mechanism by which the speed of the tractor, whether it is running free or pulling a load, will be automatically regulated or controlled. In the present structure the mechanism which controls the speed of the mechanism is automatically responsive to the load which the vehicle propels.

In this particular construction, the draw-bar mechanism L is mechanically inter-connected with the controller so as to control the various positions to which the operator may manually throw the controller lever J. It will be understood, however, that my invention contemplates the control of the speed of the vehicle by the load whether the draw-bar mechanism accomplishes this by either mechanically or electrically governing the manual operation of the controller, or by directly or indirectly actuating the controller. At the central rear portion of the frame, I provide a U-shaped draw-bar 1, the legs or parallel portions 2 of which are longitudinally slidable or movable in suitable bearings 3 formed in a suitable bracket or member 5 carried by the frame, and the bend of which extends rearwardly in convenient position for connection with the cars or load to be drawn. At its inner end the legs of this draw-bar are connected by a cross bar 4, and between this cross bar and the rear side of the bracket 5 which carries the bearings 3, I interpose a coiled or spiraled spring 7 which yieldingly resists the rearward pull exerted by the load upon the draw-bar 1.

This spring, of course, is sufficiently powerful to withstand the maximum load, but the compressive resistance of the spring varies as the pull on the draw-bar varies, and of course the longitudinal movement of the draw-bar necessarily varies. This variable movement of the draw-bar in response to varying loads is communicated to a long link or rod 10 through the medium of a lever 11. One arm of this lever, as shown clearly in Fig. 1, is connected to the movable draw-bar and the other arm thereof is connected pivotally by a short link 12 to the end of the rod 10. The lever is pivoted to the frame at 13 in any suitable manner so that as the draw-bar is pulled rearwardly, the lever acts to impart a proportionate forward longitudinal movement to the rod 10. The forward end of the rod 10 extends through and coöperates with the looped end 15 of a vertically movable member 16. This member 16 is vertically moved or reciprocated by the controller lever J. As shown clearly in Fig. 2, the upper end of the member 16 is pivotally connected to a short arm 17 fastened on the controller shaft K. Thus the operator, when he rotates the controller lever J also reciprocates the member 16 in a direction substantially perpendicular to that of the reciprocal bar or rod 10. The forward end of the bar 10 carries an interlocking member 20 having a plurality of interlocking steps or shoulders 21 arranged to be interposed in the path of movement of the lower end 15ᵃ of the member 16, Fig. 4, and to limit the degree of movement of the member 16 according to the particular interlocking step 21 interposed in its path by the movement of the rod 10. It will be obvious that the draw-bar when actuated to a greater or less degree by the pull of the load attached to it imparts a variable movement to the rod 10. The rod 10, of course, in turn interposes the particular shoulder or interlocking step 21 to the member 16 corresponding to the position occupied by the draw-bar. The interlocking shoulders 21 thus determine the degree to which the controller arm or lever may be thrown or shifted, and, as will be observed, these parts are so arranged that the greater the load on the draw-bar the greater throw will be allowed to the controller arm. Thus the operator will be permitted by the draw-bar mechanism to throw the controller arm to that position which the load on the draw-bar predetermines, and by proportioning the movement of the controller arm to the various loads the speed of the vehicle can be maintained uniform regardless of the load drawn by the vehicle. The member 16 is suspended at its upper end from the arm 17. It is yieldingly maintained against one of the angle members 17ᵃ of the vehicle frame by a spring 17ᵇ, so that when the load on the draw-bar is relieved to any degree, the return movement of the interlocking member 20 will not damage the member 16. It sometimes happens that under certain conditions an abnormal pull will be given to the draw-bar and thus enable the operator to throw the controller farther than the position to which it should be shifted or moved under normal conditions. This is particularly the case where the tractor is standing on a downward grade with a train of cars or other load connected to it, and it is started up from a dead stop. The tractor, assisted by the gravity, due to the grade, will start ahead and before the inertia of the load is overcome the draw-bar will be abnormally pulled. This abnormal movement, of course, permits undue freedom of movement to the controller handle and before the draw-bar mechanism recovers itself the operator may have thrown the controller farther than the proper position thereof corresponding to the particular condition. In order to provide for such abnormal condition, I arrange the rod 10 so that it will be "dead beat" with respect to the draw-bar mechanism—that is to say, it will not quickly respond to the sudden jerks or pulls upon said draw-bar mechanism. This I accomplish by means of a suitable dash-pot 25 mounted upon the frame of the vehicle and connected to the rod 10 by means of a bell crank lever 26, as shown clearly in Figs. 4 and 5. This dash-pot serves to render the reciprocal rod 10 slow-acting with respect to the draw-bar mechanism and will allow the draw-bar mechanism to act abnormally and recover itself before the abnormal operation effects the rod 10. In order to allow for this relative movement between the draw-bar mechanism and the lever 11, I connect the end of the lever 11 with the draw-bar through the medium of a yielding connection, such as a spring 27 (see Figs. 1, 2 and 3). This spring operates to yieldingly hold the rounded end of the lever 11 against the rear face 28 of the draw-bar cross-member 4. This spring may be fastened at its ends to upstanding posts 29 and 30 on the cross bar 4 and the end of the lever, respectively. The dash-pot 25 may be of any suitable type for the purpose, but in the present construction I have shown a dash-pot of the oil type and having two chambers, the chamber 25$^a$ of which is a reservoir chamber and the chamber 25$^b$ of which is a piston chamber in which the piston 25$^c$ operates. The piston is carried by a piston rod 25$^d$ which is pivotally connected at its upper end by means of the link 25$^e$ to the bell crank lever 26. I arrange this dash-pot so that it will be adjustable to regulate its effect upon the controller governing mechanism. The chambers 25$^a$ and 25$^b$ communicate at their upper ends through a large port 25$^f$ and through a small port 25$^g$ at their lower ends. This lower port 25$^g$ is controlled by a valve 25$^h$ so that the flow of oil to and from the piston chamber 25$^b$ may be regulated as desired.

In Fig. 6, I have illustrated an arrangement in which the draw-bar mechanism, instead of governing the manual operation of the controller, is arranged to itself directly actuate the controller. As clearly shown in Fig. 6, the forward end of the rod 10 is connected by a link 40 to the short end or arm 41 of a controller switch arm L. This switch arm is pivoted at 42 so that the longitudinal movement of the link 10 is adapted to rotate the switch arm L about its pivot and move the end of its longer arm 43 over the controller contacts 44 so as to vary the resistance in the motor circuit to govern the speed of the motor. The controller which I have illustrated in Fig. 6 is intended merely as representative of any suitable or approved type of controller which may be used for governing the speed of the motor and to which the draw-bar mechanism may be connected so that it will directly actuate the controller. In this arrangement the conductor 44 leads from a source of current to the contact of a switch 45 which is connected by the conductor 46 to one end of the resistance M of the controller. The other conductor 47 leads from the source of current to the motor N, and from thence to the switch or controller arm L. Thus it will be obvious that the forward longitudinal movement of the linked end operates the switch arm L to cut resistance out of the circuit and compensate for the load on the draw-bar, the resistance in the circuit being thus automatically varied in accordance with the load on said circuit. The switch 45 may be located for convenient access to the operator. The operator need only close or open the circuit to the motor and controller and the speed of the motor will, of course, be governed automatically by the pull on the draw bar connection.

What I claim as my invention is:

1. The combination of a draft vehicle, a draft member adapted for connection with the load to be drawn, a controller for said vehicle having a range of operation by which the speed of the vehicle is determined, and means actuated by said draft member in response to the pull thereon for governing the operation of said controller within said range.

2. The combination of a power driven draft vehicle, a manually operated controller therefor, and a draw bar adapted for connection with the load to be drawn for regulating the manual operation of said controller.

3. The combination of a power driven draft vehicle, a controller for governing the speed of said vehicle, a lock for the controller, and a draw bar to which the load is connected for actuating the lock to release said controller in response to a load on the draw-bar.

4. The combination of a power driven draft vehicle, a draft member carried by said vehicle to which the load to be drawn is connected, a controller for the vehicle, and means interconnecting said draft member and said controller for rendering the controller responsive to the pull of the load upon the draft member.

5. The combination of a motor-driven load-propelling vehicle, a member carried by said vehicle to which the load is adapted to be connected, a controller for said vehicle, and mechanism interconnecting said load member and said controller to render the operation of the controller dependent upon the load value at said member.

6. The combination of a motor-driven load-propelling vehicle, a member carried by said vehicle to which the load is adapted to be connected, a controller for said vehicle, mechanism interconnecting said load member and said controller to render the operation of the controller dependent upon the load value at said member, and means for rendering said mechanism irresponsive to abnormal variations of load value at said member.

7. The combination of a draft vehicle, a manually operable controller for said vehicle, and an automatic draw bar adapted for connection with the load and connected with said controller for determining the position to which said controller can be operated according to the variations of the load.

8. The combination of a power propelled vehicle, a controller for said vehicle having a predetermined range of operation, a second vehicle, a yielding draw bar connection between the two vehicles, and a graduated lock for said controller actuated by said draw bar in accordance with the pull of said second vehicle for determining the extent of operation of said controller within its range.

9. The combination of a self-propelling vehicle and a propelled vehicle, a manually operated controller for said self-propelling vehicle having a definite range of operation for governing the operation of said vehicle, a variable lock for said controller, and a variable connection between said vehicles responsive to draft variations on said connection for actuating said lock.

10. The combination of a motor propelled tractor having a controller for regulating the operation of said tractor, a yieldable draw bar on said tractor to which the load is connected, and a bar connected with said controller and draw bar and actuated by said draw bar to regulate the operation of the controller in accordance with the draft on the draw bar.

11. The combination of a motor propelled tractor having a controller for regulating the operation of said tractor, a yieldable draw bar on said tractor to which the load is connected, a shiftable bar connected with said controller and draw bar and actuated by said draw bar to regulate the operation of the controller in accordance with the draft of the load on the draw bar, and a yielding connection between the bar and draw bar.

12. The combination of a motor propelled vehicle having a controller for governing its operation, a movable slotted member connected with said controller, a movable draw bar carried by said vehicle, spring mechanism resisting the pull of said draw bar, a shiftable rod connected to and moved by said draw bar, and means on said rod coöperating with the slot in said member for limiting the movement of the controller to correspond to the degree of pull on the draw bar.

Signed by me at Chicago, Illinois, this 26th day of July, 1915.

GEORGE W. BULLEY.

Witnesses:
E. H. CLEGG,
M. HAMILTON.